US008938466B2

(12) United States Patent
Stiver et al.

(10) Patent No.: US 8,938,466 B2
(45) Date of Patent: Jan. 20, 2015

(54) SYSTEMS AND METHODS FOR RANKING DOCUMENTS

(75) Inventors: Mark C. Stiver, Brookville, OH (US); Vimal Koul, West Chester, OH (US); Euphemia H. Miller, Walnut Creek, CA (US); Jeff A. Seitter, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 767 days.

(21) Appl. No.: 12/688,365

(22) Filed: Jan. 15, 2010

(65) Prior Publication Data

US 2011/0179024 A1 Jul. 21, 2011

(51) Int. Cl.
*G06F 17/30* (2006.01)

(52) U.S. Cl.
CPC .... *G06F 17/30696* (2013.01); *G06F 17/30675* (2013.01)
USPC .......................................... 707/766; 707/759

(58) Field of Classification Search
CPC .................. G06F 17/30864; G06F 17/30867; G06F 17/3064; G06F 17/30696; G06F 17/30675
See application file for complete search history.

(56) References Cited

U.S. PATENT DOCUMENTS

| 5,737,734 | A | | 4/1998 | Schultz | |
|---|---|---|---|---|---|
| 5,802,515 | A | | 9/1998 | Adar et al. | |
| 5,926,811 | A | * | 7/1999 | Miller et al. | 707/748 |
| 5,991,780 | A | * | 11/1999 | Rivette et al. | 715/255 |
| 6,012,055 | A | * | 1/2000 | Campbell et al. | 1/1 |
| 6,081,798 | A | * | 6/2000 | Johnson et al. | 706/54 |
| 6,397,211 | B1 | | 5/2002 | Cooper | |
| 6,564,213 | B1 | * | 5/2003 | Ortega et al. | 1/1 |
| 7,792,803 | B2 | * | 9/2010 | Ikeyama | 707/672 |
| 8,055,638 | B2 | * | 11/2011 | Schechter et al. | 707/705 |
| 8,447,760 | B1 | * | 5/2013 | Tong et al. | 707/728 |
| 8,583,675 | B1 | * | 11/2013 | Haahr et al. | 707/767 |
| 2003/0074634 | A1 | * | 4/2003 | Emmelmann | 715/513 |
| 2003/0115191 | A1 | * | 6/2003 | Copperman et al. | 707/3 |
| 2005/0283466 | A1 | * | 12/2005 | Dettinger et al. | 707/3 |
| 2006/0074870 | A1 | * | 4/2006 | Brill et al. | 707/3 |
| 2007/0185865 | A1 | * | 8/2007 | Budzik et al. | 707/5 |
| 2007/0192281 | A1 | * | 8/2007 | Cradick et al. | 707/2 |
| 2008/0016046 | A1 | * | 1/2008 | Guha | 707/3 |
| 2008/0065617 | A1 | * | 3/2008 | Burke et al. | 707/5 |
| 2008/0208819 | A1 | * | 8/2008 | Wang et al. | 707/3 |
| 2008/0262860 | A1 | | 10/2008 | Schneider et al. | |
| 2009/0248674 | A1 | * | 10/2009 | Suzuki et al. | 707/5 |
| 2009/0248879 | A1 | * | 10/2009 | Martis et al. | 709/227 |
| 2009/0276419 | A1 | * | 11/2009 | Jones et al. | 707/5 |

(Continued)

OTHER PUBLICATIONS

Surf Canyon Receives Seed Funding for Search Application, May 28, 2008, PR Newswire, 2 pages.

(Continued)

*Primary Examiner* — Polina Peach
(74) *Attorney, Agent, or Firm* — Dinsmore & Shohl LLP

(57) ABSTRACT

Systems, methods, and computer-readable media are provided for ranking documents. An exemplary method includes receiving a plurality of queries from a user that are related to a search topic. The queries are compared to a plurality of documents stored in a database to identify candidate documents that match one or more of the queries. The number of matching queries is determined for the candidate documents. The candidate documents are ranked, using a computer processor, for relevance to the search topic based at least on the number of matching queries for each respective candidate document.

18 Claims, 7 Drawing Sheets

(56) References Cited

U.S. PATENT DOCUMENTS

2010/0318546 A1* 12/2010 Kenthapadi et al. .......... 707/759
2011/0219004 A1* 9/2011 Jin ................................. 707/740
2011/0276915 A1* 11/2011 Freire et al. ................... 715/772

OTHER PUBLICATIONS

Printout of http://www.surfcanyon.com, downloaded on May 5, 2010.

Tim Nott, Seek and You Will Find, Jan. 24, 2008, Personal Computer World, 5 pages.

Printout of http://www.clusty.com, downloaded on May 6, 2010.

International Search Report and Written Opinion, mailed Mar. 9, 2011, in corresponding International application No. PCT/US10/60226, filed on Dec. 14, 2010 (8 pages).

New Zealand Patent Application No. 601132, First Examination Report mailed Apr. 29, 2013.

* cited by examiner

SYSTEMS AND METHODS FOR RANKING DOCUMENTS

BACKGROUND

I. Technical Field

This disclosure generally relates to the field of computer software. More particularly, and without limitation, the disclosure relates to systems and methods for ranking documents.

II. Background Information

Existing search tools allow users to search for documents in a database by specifying queries. For example, in a boolean query, the user specifies operators such as AND and OR to connect search terms. As another example, in a natural language query, the user frames their query as a question. The search tools then execute the user queries by searching a database of various documents. Following the search, the search tools provide a result set of documents ("candidate documents") to the user for each query. The user will then examine the result set to determine whether to view one or more of the candidate documents.

A user who is searching for documents related to particular topic of interest will often execute a number of related queries to find as many candidate documents for the topic as possible. As a result, users may spend a significant amount of time and effort executing queries on a single topic before deciding that their search has found a sufficient number of relevant candidate documents. In some cases, this is expensive, because users pay to use the search tools on a per-query basis. Although users generally gain proficiency as they learn to use the search tools more effectively, even experienced users typically execute a substantial number of queries on a single topic before being satisfied that the topic has been thoroughly searched.

As a large number of queries are typically executed for a given search topic, and each individual query on the topic may return a large result set of candidate documents, the total number of candidate documents found for a given topic may be large. Users will often keep track of the candidate documents in the result set for each query, and may tend to look more closely at candidate documents that appear in multiple queries, or that appear at or near the top of a list of candidate documents. However, the user must manually identify the candidate documents that are returned by multiple queries.

Moreover, users often tend to disregard certain candidate documents that may actually be relevant, because these candidate documents are ranked relatively low for each query the user executed. For example, the user may enter five queries on a given topic, and a particular candidate document may appear in the result set for each of these five queries, but be ranked relatively low in each result set. In such a situation, the user will often not take the time to review all of the candidate documents in each result set. Instead, the user may focus on the higher-ranked candidate documents. If so, the user would not notice that a candidate document matched each executed query, because the candidate document was ranked too low in each result set for the user to notice. However, the fact that the candidate document matched all or most of the queries suggests that the candidate document may actually be relevant to the topic being searched by the user, even though the candidate document was not ranked highly for any particular query the user entered while searching the topic.

SUMMARY

Consistent with disclosed embodiments, computer-implemented methods, computer systems, and a computer-readable media are provided that evaluate search result sets across multiple queries for a single topic, and rank candidate documents based on the number of queries that each of the candidate documents matches.

A computer-implemented method for ranking documents may include: receiving a plurality of queries from a user, the plurality of queries being related to a search topic; comparing the queries to a plurality of documents stored in a database to identify candidate documents, each of the candidate documents matching one or more of the queries; determining, for the candidate documents, the number of matching queries; and ranking, using a computer processor, the candidate documents for relevance to the search topic based at least on the number of matching queries for each respective candidate document.

A computer-readable medium may store program instructions for performing a method executed by a processor. The method may be for ranking documents, and include steps performed by the processor of: receiving a plurality of queries from a user, the plurality of queries being related to a search topic; comparing the queries to a plurality of documents stored in a database to identify candidate documents, each of the candidate documents matching one or more of the queries; determining, for the candidate documents, the number of matching queries; and ranking the candidate documents for relevance to the search topic based at least on the number of matching queries for each respective candidate document.

A system for ranking documents may include a processor for executing program instructions; and a computer-readable medium storing the program instructions. The program instructions, when executed by the processor, may perform a method to: receive a plurality of queries from a user, the plurality of queries being related to a search topic; compare the queries to a plurality of documents stored in a database to identify candidate documents, each of the candidate documents matching one or more of the queries; determine, for the candidate documents, the number of matching queries; and rank the candidate documents for relevance to the search topic based at least on the number of matching queries for each respective candidate document.

A computer-implemented method for ranking documents may include: providing, to a user, a representation of a plurality of queries previously executed by the user, the queries being executed on a database comprising a plurality of documents to determine a set of candidate documents matching at least one of the queries; receiving a user selection of a subset of the queries; determining the number of the selected queries that match the candidate documents; and ranking, using a computer processor, the candidate documents based at least on the number of matching selected queries.

A system for ranking documents may include a processor for executing program instructions; and a computer-readable medium storing the program instructions. The program instructions, when executed by the processor, may perform a method to: provide, to a user, a representation of a plurality of queries previously executed by the user, the queries being executed on a database comprising a plurality of documents to determine a set of candidate documents matching at least one of the queries; receive a user selection of a subset of the queries; determine the number of the selected queries that match the candidate documents; and rank the candidate documents based at least on the number of matching selected queries.

A computer-readable medium may store program instructions for performing a method executed by a processor. The method may be for ranking documents, and include steps performed by the processor of: providing, to a user, a representation of a plurality of queries previously executed by the user, the queries being executed on a database comprising a plurality of documents to determine a set of candidate documents matching at least one of the queries; receiving a user selection of a subset of the queries; determining the number of the selected queries that match the candidate documents; and ranking the candidate documents based at least on the number of matching selected queries.

It is to be understood that both the foregoing general description and the following detailed description are exemplary and explanatory only.

BRIEF DESCRIPTION OF THE DRAWINGS

The accompanying drawings, which are incorporated in and constitute a part of this disclosure, illustrate various embodiments. In the drawings.

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

Figure 1:
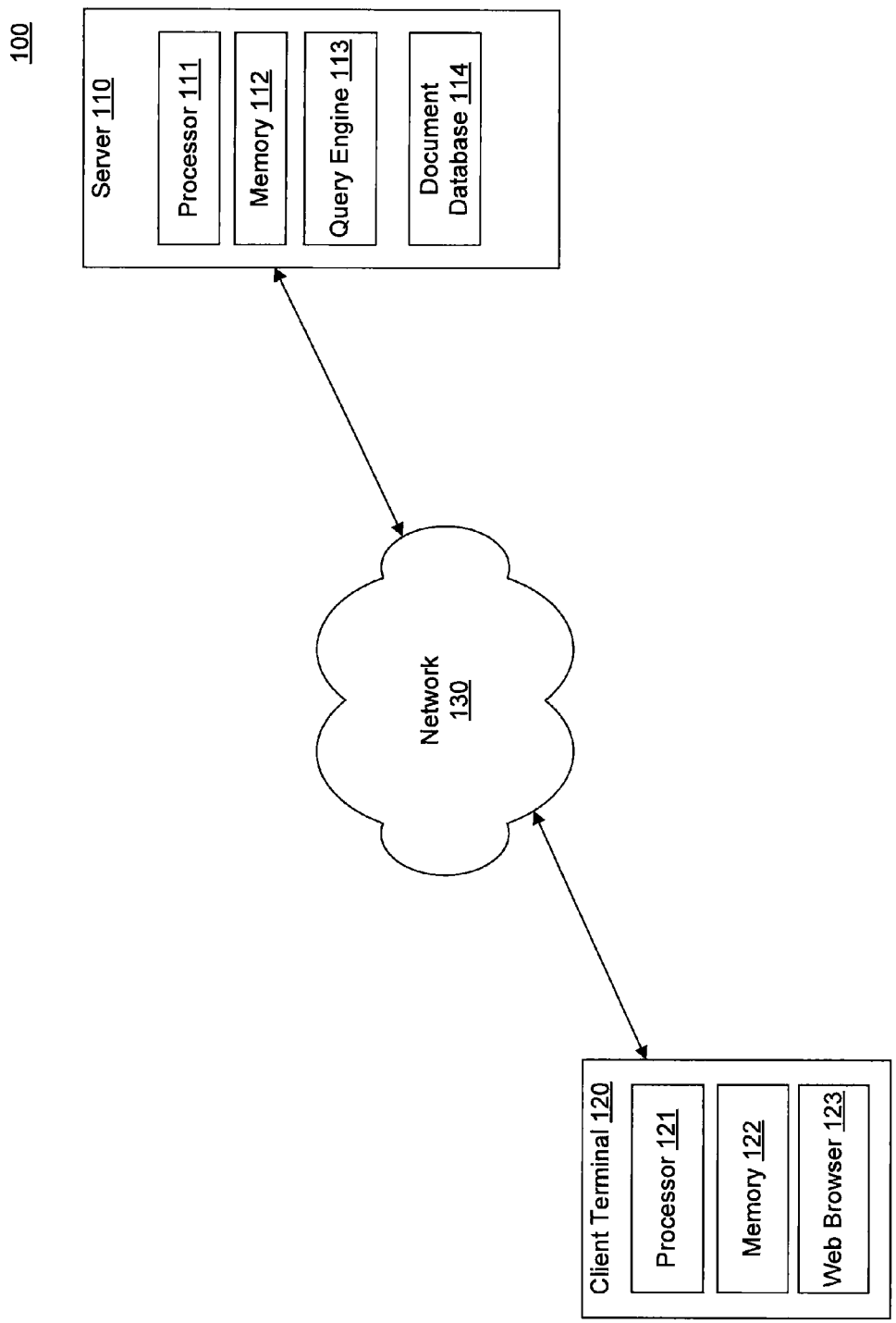
FIG. 1 is a block diagram of an exemplary system, consistent with disclosed embodiments.

FIG. 1 illustrates an exemplary computing system 100 for providing documents in response to user queries, consistent with one or more embodiments. System 100 may provide functionality for one or more client terminals to request documents from a database. As shown in system 100, server 110 and client terminal 120 are connected to a network 130. One of skill in the art will appreciate that although a particular number of components are depicted in FIG. 1, any number of these components may be provided.

Network 130 provides communications between the various components in system 100, such as server 110 and client terminal 120. Network 130 may be a shared, public, or private network, may encompass a wide area or local area, and may be implemented through any suitable combination of wired and/or wireless communication networks. Furthermore, network 130 may comprise an intranet or the Internet.

Server 110 may comprise a general purpose computer (e.g., a personal computer, network computer, server, or mainframe computer) having one or more processors that may be selectively activated or reconfigured by a computer program. Processor 111 may perform steps or methods consistent with disclosed embodiments by reading instructions from memory 112, and executing the instructions. As discussed in more detail below, certain components of server 110 may be implemented as instructions stored in memory 112, suitable for execution by processor 111.

Memory 112 may be one or more memory or storage devices that store data as well as software. Memory 112 may also comprise, for example, one or more of RAM, ROM, magnetic storage, or optical storage media. Furthermore, memory 112 may store program modules that, when executed by processor 111, perform one or more steps discussed below. In other embodiments, server 110 may be specially constructed for carrying-out methods consistent with disclosed embodiments. For example, one or more of the processing steps disclosed herein may be implemented on a field-programmable gate array ("FPGA"), application-specific integrated circuit ("ASIC") or suitable chipset.

Server 110 may further comprise a query engine 113 that receives queries from client terminal 120 and executes the queries to identify result sets of candidate documents that match the queries. Query engine 113 may execute the queries by searching for documents in document database 114 that match the query terms. Query engine 113 may then provide the result sets of candidate documents to client terminal 120 by transmitting the result sets across network 130.

Figure 2A:
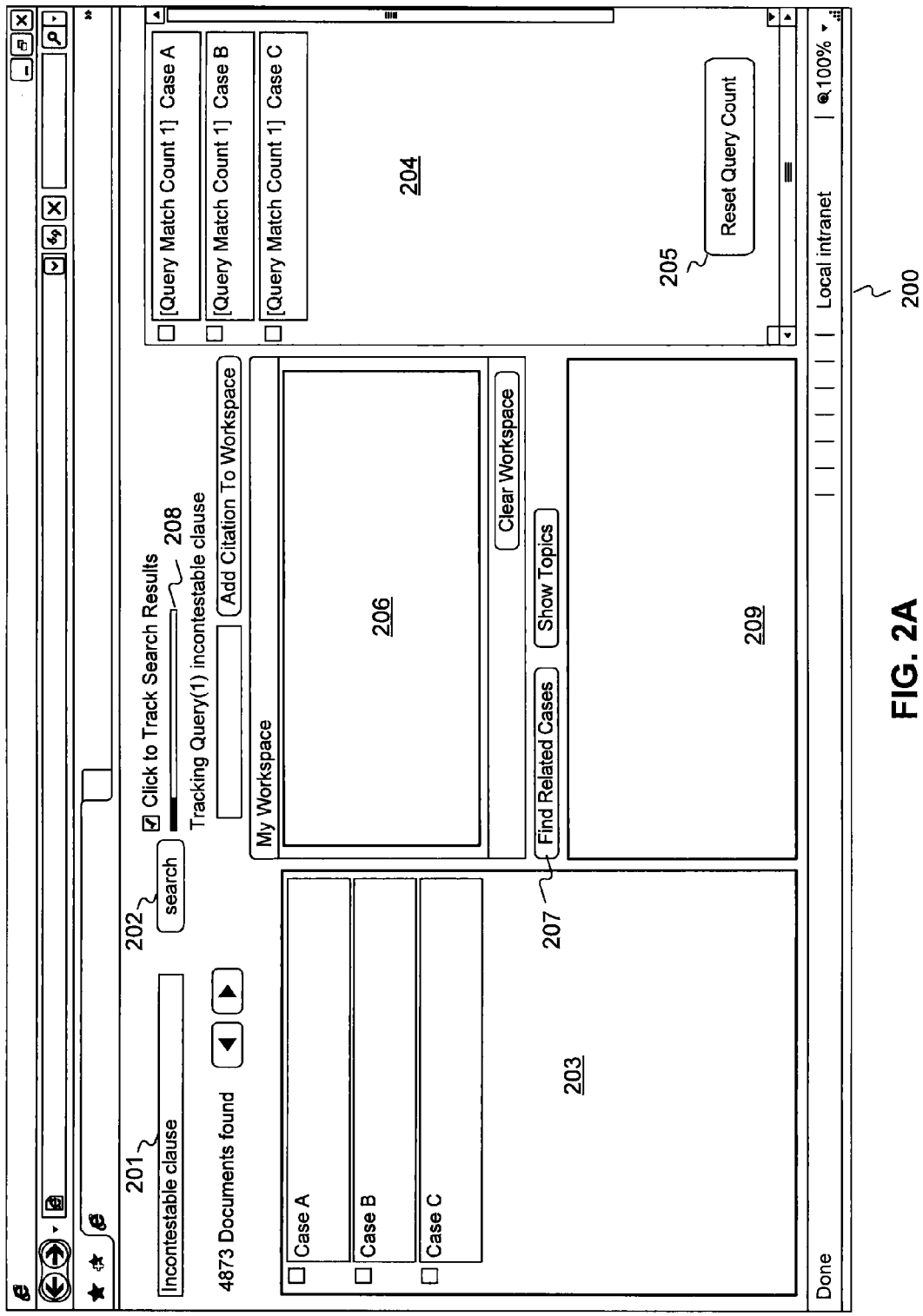
FIG. 2A illustrates an exemplary user interface, consistent with disclosed embodiments.
Figure 2B:
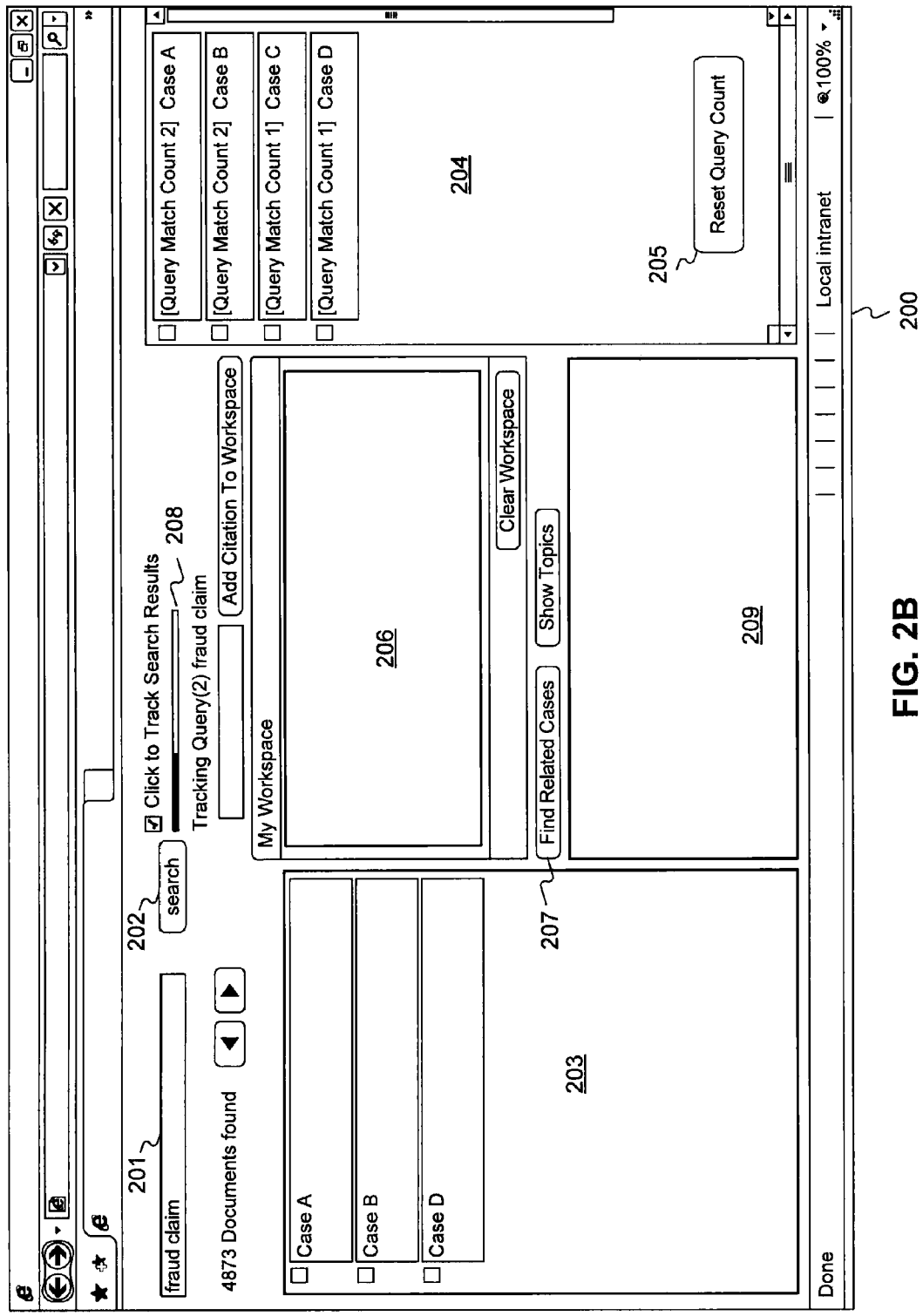
FIG. 2B illustrates an exemplary user interface, consistent with disclosed embodiments.
Figure 2C:
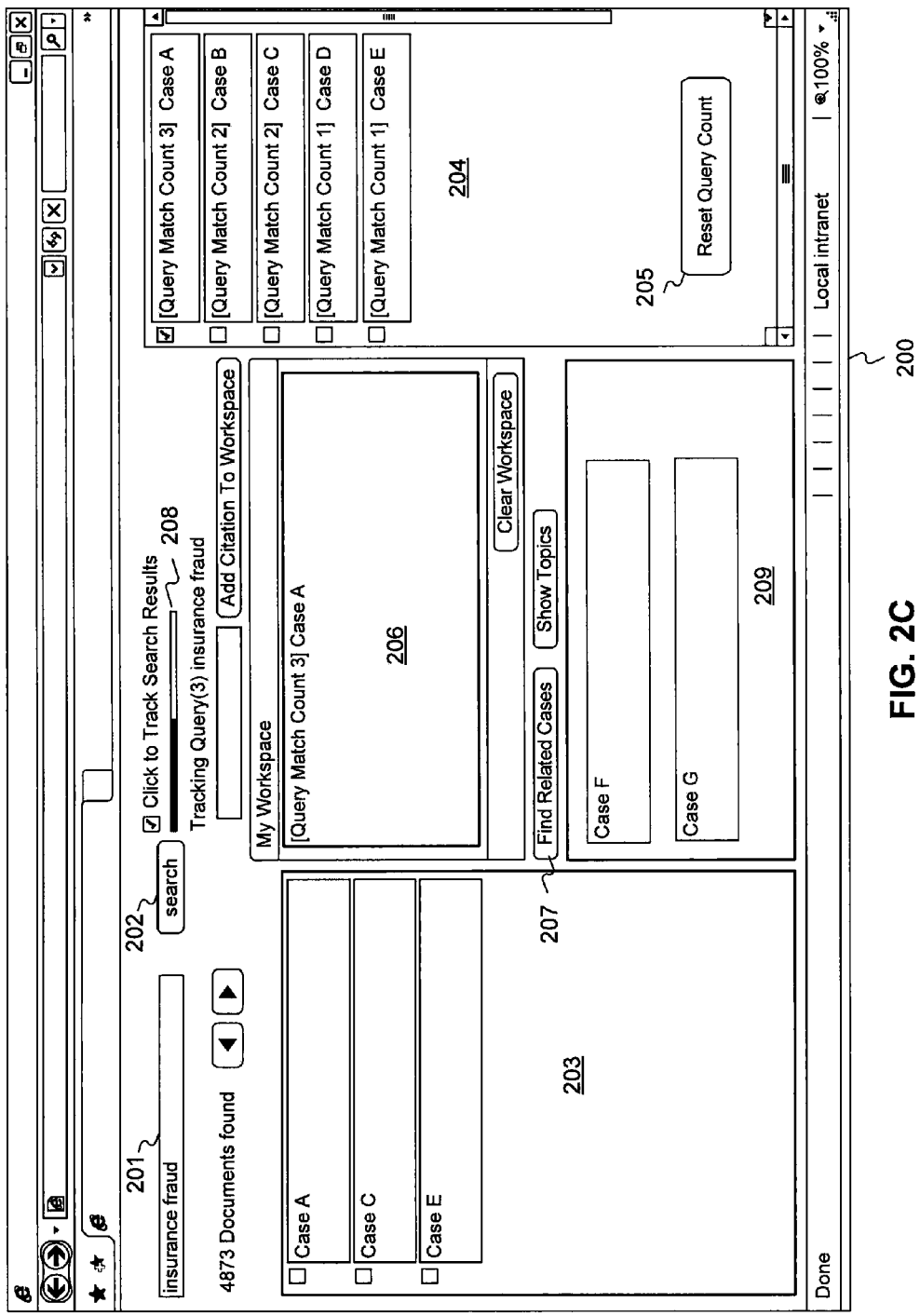
FIG. 2C illustrates an exemplary user interface, consistent with disclosed embodiments.

Client terminal 120 may be similar in construction to server 110. For example, client terminal 120 may include a processor 121 and a memory 122, which may be similar in construction to processor 111 and processor 112, as discussed above with respect to server 110. Client terminal 120 may also include a web browser 123. Web browser 123 may display one or more web pages on client terminal 120, such as query interface 200, which is shown in FIGS. 2A-2C and discussed below in further detail. A user at client terminal 120 may submit various queries using client terminal 120. Client terminal 120 may transmit these queries to query engine 113 on server 110. Client terminal 120 may receive result sets of candidate documents received from query engine 113, in response to the queries entered by the user.

One of ordinary skill in the art also will recognize that functions provided by one or more components of system 100 may be combined into one component, or distributed across a plurality of components. For example, server 110 may be implemented using a server farm including several main servers as well as several backup servers. In addition, server 110 may be implemented by distributing various processing steps discussed herein across multiple servers. Furthermore, the functions of client terminal 120 and server 110 may be combined into a single computer. As another example, document database 114 may be implemented on a separate computer, accessible by server 110 over a network such as network 130. One of ordinary skill will recognize that disclosed embodiments may be implemented by computers or workstations organized as shown, organized in a distributed processing system architecture, or organized in myriad suitable combinations of software, hardware, and/or firmware.

Using exemplary computing system 100, it is possible to implement methods for providing documents to a user. As discussed below in more detail, users at client terminal 120 may interact with query interface 200 to search for documents in document database 114. FIGS. 2A-2C illustrate exemplary states of query interface 200 as a user progresses through a search for court opinions. Although the following discussion refers to examples in which the user interacts with query interface 200 to search for court opinions, any kind of document may be suitable for use with the methods and systems disclosed herein.

Query interface 200 may include various user interface elements for searching for documents in document database 114. For example, query interface 200 may include a query text box 201, where a user may enter a query, as well as a search button 202 for submitting the query to server 110. Query interface 200 may display documents that match the query in current query match list 203.

As the user continues to enter queries on a particular topic, server 110 may rank the documents in document database 114 based on the number of different queries that the documents match. Generally speaking, those documents that match more queries may be ranked more highly than those documents that match fewer queries. Query interface 200 may include a ranked candidate document list 304, for displaying the documents in the order that they are ranked by server 110. Query interface 200 may also include a progress bar 208, which is updated as the user enters queries to indicate the number of queries that the user has executed. If the user decides they would like to begin searching on a new topic, they may start a new document ranking session by clicking reset query count icon 205.

Users may also collect documents of interest by dragging and dropping selected cases from current query match list 203 or ranked candidate document list 204 into My Workspace 206. As discussed in more detail below, users may also choose to search for documents that are related to the documents in My Workspace 206 by clicking Find Related Cases icon 207. When a user clicks Find Related Cases icon 207, server 110 may search for documents that are related to the documents in My Workspace 206, and display the related documents in Related Cases workspace 209.

Figure 3:
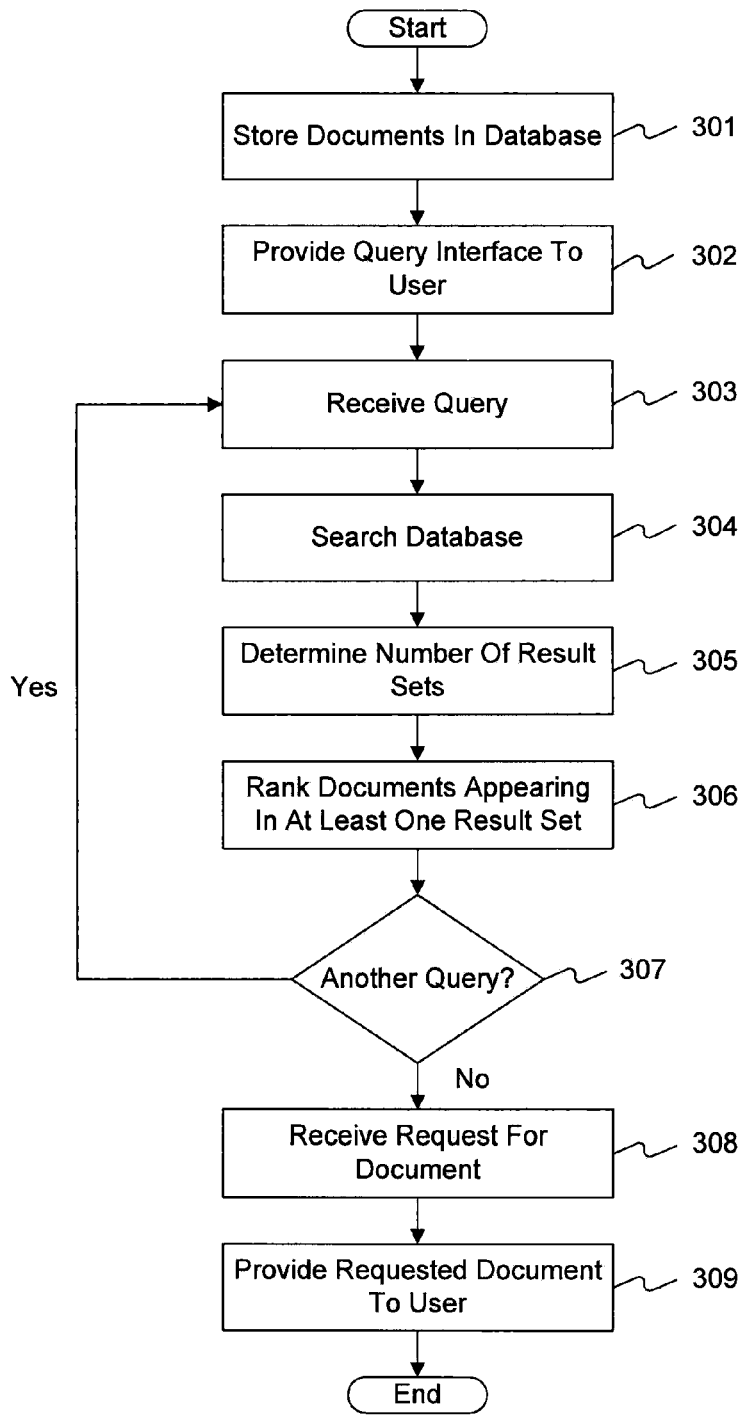
FIG. 3 is a flowchart of an exemplary method, consistent with disclosed embodiments.

FIG. 3 is a flowchart of a method 300 for ranking documents. As shown in FIG. 3, method 300 may begin at step 301, where server 110 may store documents in document database 114. For example, server 110 may store court opinions in document database 114. In the example discussed below, document database 114 includes five court opinions, i.e., Cases A, B, C, D, and E. The court opinions may be in any number of different formats, such as word processing files, text files, or other file formats suitable for storing documents such as court opinions. In some embodiments, the documents may be indexed in document database 114 by words that appear in the opinions or common query terms, to improve the speed at which query engine 113 can respond to queries from client terminal 120.

In step 302, server 110 may provide a query interface to the user of client terminal 120. For example, query engine 113 may transmit query interface 200 to client terminal 120. Client terminal 120 may then display query interface 200 to the user in web browser 123.

In step 303, server 110 may receive a query from the user. As shown in FIG. 2A, the user may enter a query (e.g., "Incontestable clause") into query text box 201, and click search button 202. Client terminal 120 may then transmit a first query (e.g., "Incontestable clause") to server 110, and query engine 113 may receive the first query for subsequent processing.

In step 304, query engine 113 may search document database 114 for documents that match the query to create a first result set of candidate documents. For the purposes of this example, Cases A, B, and C match the first query, and are therefore part of the first result set. As shown in FIG. 2A, query engine 113 may also populate current query match list 203 of query interface 200 with the matching cases during this step, and transmit an updated version of query interface 200 to the user at client terminal 120. Thus, the user can see in current query match list 203 that three cases, A, B, and C, matched their first query.

In step 305, query engine 113 may determine the number of result sets that each candidate document appears in. At this point in the example, Cases A, B, and C have each appeared as candidate documents in one result set, while cases D and E have not appeared in any result sets.

In step 306, query engine 113 may rank the candidate documents that appear in at least one result set, based on the number of result sets that each candidate document appears in. Here, Cases A, B, and C each appear in one result set, so they are ranked equally. In this step, query engine 113 may also update ranked candidate document list 204 to reflect the rankings, as shown in FIG. 2A. Ranked candidate document list 204 may also include an indication of the number of queries that each candidate document has matched, i.e., one. At this point, Cases A, B, and C may all be ranked equally based on the single result set that they each appear in. In some embodiments, alphabetical order may be used to determine the order in which candidate documents with equal ranking are ordered.

Next, method 300 proceeds to decision block 307. If the user decides to stop entering queries, method 300 may proceed to step 308, which is discussed in more detail below. Otherwise, if the user decides to enter more queries, method 300 may return to step 303.

For the purposes of the example, the user decides to enter a second query, and method 300 returns to step 303. As shown in FIG. 2B, the user may enter a second query, "Fraud claim," in query text box 201, and then click search button 202. Client terminal 120 may then transmit the second query "Fraud claim" to server 110, and query engine 113 may receive the second query for subsequent processing.

Next, in step 304, query engine 113 may search document database 114 for documents that match the second query, to create a second result set of candidate documents. For the purposes of this example, Cases A, B, and D match the second query and are therefore part of the second result set. As shown in FIG. 2B, query engine 113 may also populate current query match list 203 of query interface 200 with the matching cases during this step, and transmit an updated version of query interface 200 to the user at client terminal 120. Thus, as shown in FIG. 2B, the user at client terminal 120 can see in current query match list 203 that three cases, A, B, and D, matched the second query.

In step 305, query engine 113 may determine the number of result sets that each candidate document appears in. At this point in the example, Cases A and B have each appeared in both the first and second result sets, case C appeared in the first result set only, and case D appeared in the second result set only.

In step 306, query engine 113 may rank the candidate documents that appear in at least one result set, based on the number of result sets that each candidate document appears in. Here, Cases A and B each appear in two result sets, so they are ranked ahead of cases C and D, which appear in only one result set. At this step, query engine 113 may also update ranked candidate document list 204 to reflect the rankings, as shown in FIG. 2B, along with an indication of the number of result sets ("Query Match Count").

Again, method 300 may proceed to decision block 307. In this example, the user decides to enter more queries. Accordingly, method 300 may return to step 303, and the user enters a third query. In the example, as shown in FIG. 2C, the user may enter the third query, "Insurance fraud," in query text box 201, and then click search button 202. Client terminal 120 may then transmit the third query "Insurance fraud" to server 110, and query engine 113 may receive the third query for subsequent processing.

In step 304, query engine 113 may search document database 114 for documents that match the third query, to create a third result set. For the purposes of this example, Cases A, C, and E match the third query and are therefore part of the third result set. As shown in FIG. 2C, query engine 113 may also populate current query match list 203 of query interface 200 with the matching cases during this step, and transmit an updated version of query interface 200 to the user at client terminal 120. Thus, the user at client terminal 120 can see that three cases, A, C, and E, matched their third query by viewing current query match list 203, as shown in FIG. 2C.

In step 305, query engine 113 may determine the number of result sets that each candidate document appears in. In this example, at this point, Case A has appeared in all three result sets. Case B appeared in two result sets, i.e., the first and second result sets, and case C also appeared in two result sets, i.e., the first and third result sets. Case D appeared in the second result set only, while case E appeared in the third result set only.

In step 306, query engine 113 may rank the candidate documents that appear in at least one result set, based on the number of result sets that each candidate document appears in. Here, Case A is ranked first with three query matches, cases B and C are ranked next with two query matches, and cases D and E are ranked last with one query match each. In this step, query engine 113 may also update ranked candidate document list 204 to reflect the rankings, as shown in FIG. 2C.

Method 300 may return to decision block 307. In this example, however, the user is finished entering queries, so method 300 may move to step 308.

In step 308, server 110 may receive a request for one of the candidate documents shown in FIG. 2C. For example, ranked candidate document list 204 may include hyperlinks or other references to one or more of the candidate documents listed therein. The user at client terminal 120 may select (e.g., by clicking) "Case A" in ranked candidate document list 204 to activate the hyperlink for Case A, and client terminal 120 may transmit a request for Case A to server 110.

Next, method 300 may proceed to step 309, where server 110 provides the requested document to the user. For example, server 110 may retrieve Case A from document database 114 and transmit Case A to client terminal 120. Client terminal 120 may then display Case A to the user, for example in web browser 123.

Thus, in the example discussed above, the user does not need to manually track which candidate documents are returned by multiple queries. Instead, query engine 113 tracks each time a candidate document is returned by a particular query, and continually updates the rankings of each candidate document based on the number of queries that the candidate document matched. As the user continues to enter more queries, the most relevant candidate documents to the user will tend to move to the top of ranked candidate document list 204.

Method 300 may be particularly useful in situations where a large number of candidate documents are returned by one or more queries. In such circumstances, a particularly relevant candidate document may tend to be buried in the result set for each individual query. For example, assume the first, second, and third queries discussed above each returned 100 candidate documents. Thus, each time the user executes a query, current query match list 203 will list all 100 candidate documents, perhaps ranked according to their relevance to each individual query. The user may ignore the lower-ranked results for each individual query, preferring instead to concentrate on the top ten results for each query.

If a particular candidate document, such as Case A, does not appear in the top ten results for any particular query, the user may never notice that Case A was in the result set for all of the queries. However, as the user continues to enter queries and Case A continues to match the queries entered by the user, Case A will move toward the top of ranked candidate document list 204. Thus, method 300 may bring Case A to the user's attention, whereas the user would not have noticed Case A by manually reviewing the results of each query.

In many cases, six or seven queries may be sufficient for the user to have confidence that a given topic has been thoroughly searched. Query interface 200 may include a progress bar 208 to give the user an indication of how their search is progressing for a particular topic. In the example shown in FIGS. 2A-2C, progress bar 208 may be updated each time the user enters a query. After the seventh query, progress bar 208 may indicate that the user had most likely performed sufficient queries to obtain the most relevant result candidate documents.

Once a user decides to stop searching for documents on a given topic, the user may click reset query count icon 205 in query interface 200. When the user does so, client terminal 120 may transmit a message to server 110 indicating that the user is finished searching on the topic. Query engine 113 may then reset query interface 200, for example by updating progress bar 208 to indicate that no searches have been performed. At this time, query engine 113 may also clear current query match list 203 and ranked candidate document list 204, and reset the query match count for each candidate document in document database 114.

In the embodiments discussed above, query engine 113 may have automatically tracked the number of result sets that each candidate document appeared in, starting from the user's first query until they select reset query count icon 205 to reset the search. Alternatively, in some embodiments, users may manually decide which queries to use in method 300. Users may manually choose queries using history tree 400, shown in FIG. 4.

Figure 4:
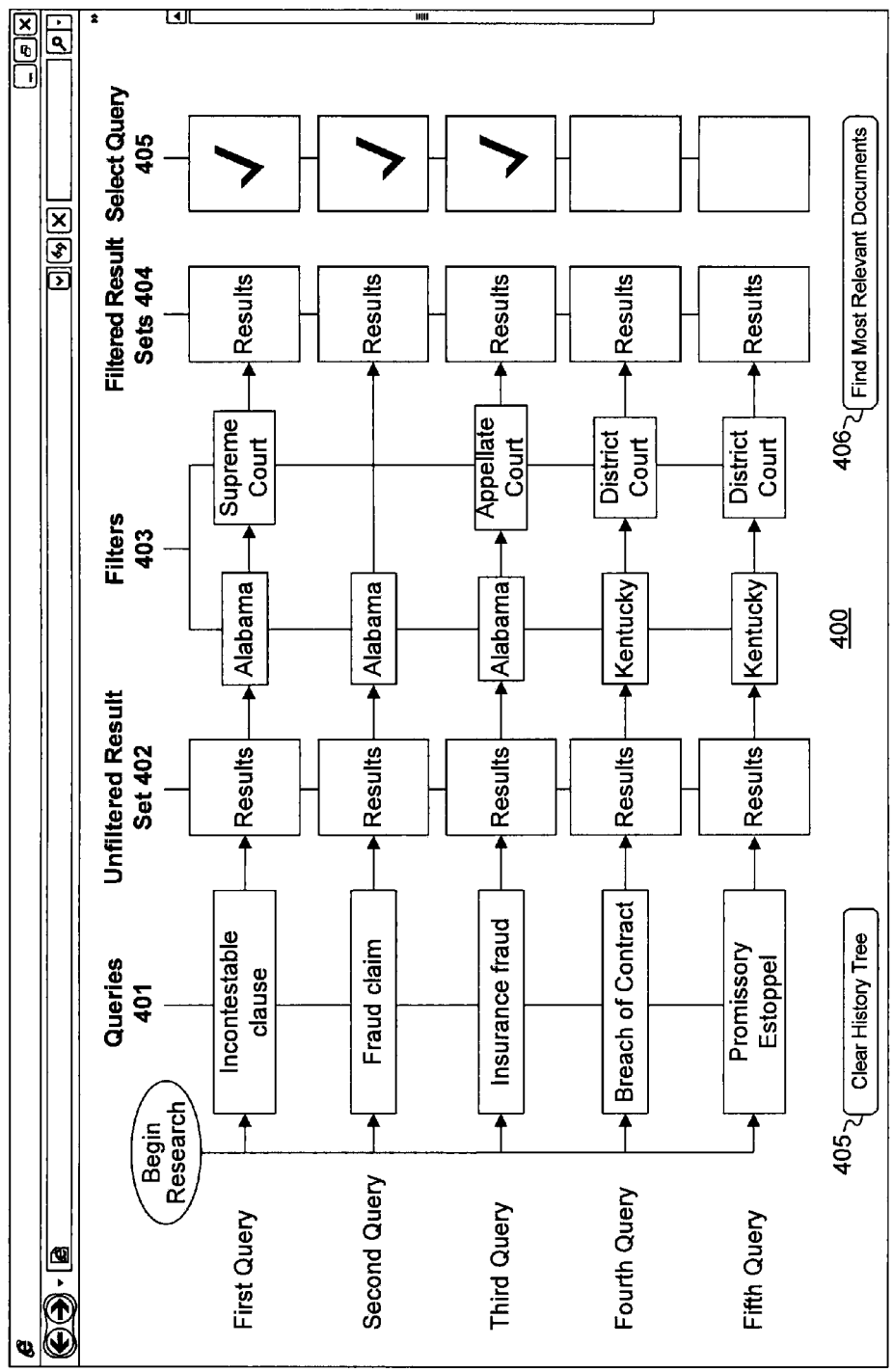
FIG. 4 illustrates an exemplary user interface, consistent with disclosed embodiments.

As shown in FIG. 4, history tree 400 may include query icons 401, each of which represents a particular query entered by the user. Each time the user enters a new query, a new query icon 401 is added to history tree 400. History tree 400 may also include unfiltered result set icons 402, which represent the result sets returned from the corresponding query before any filtering is performed. In some embodiments, the user may click on a particular unfiltered result set icon 402 to activate a hyperlink to the result set for the corresponding query.

Figure 5:
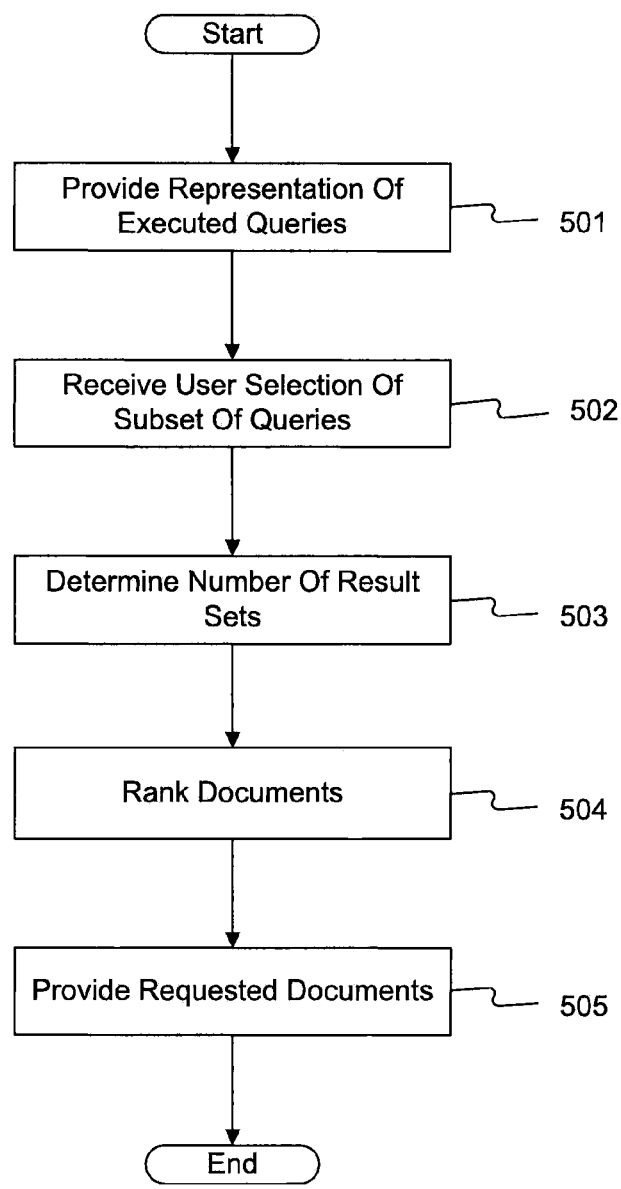
FIG. 5 is a flowchart of an exemplary method, consistent with disclosed embodiments.

History tree 400 may also include filter icons 402, which may represent certain filters the user applies to the result set for a particular query. For example, in embodiments where document database 114 comprises court opinions, the user may filter the court cases by the date of the opinion, by the state in which the case took place, by the court that issued the opinion, etc. Filtered result sets icons 404 may represent the result sets for each query, after the filtering is applied. Like unfiltered result set icons 402, a user may click on one of the filtered result set icons 404 to view the filtered result set for the corresponding query. History tree 400 may also include select query icons 405, which allow the user to select certain queries for further processing using method 500 as discussed below, and as shown in FIG. 5.

Before method 500 begins, the user may execute a number of different queries using system 100, perhaps during a browser session on web browser 123. To execute these queries, the user may use an interface such as query interface 200, or any suitable interface for executing queries on document database 114. As the user executes the queries, query engine 113 tracks the candidate documents that are returned as query results, and builds history tree 400. Once query engine 113 builds history tree 400, query engine 113 may implement method 500 to rank the candidate documents from the previously-executed queries in a manner similar to that discussed above with respect to method 300.

Method 500 may begin at step 501 by providing a representation of queries that have been executed by the user. For example, query engine 113 may create a representation of history tree 400 as a web page, and transmit the web page to client terminal 120. As shown in FIG. 4, the user's query history includes five queries, as well as corresponding unfiltered result sets, filters, and result sets. For the purposes of this example, the first three queries are identical to the three queries discussed above with respect to method 300, which relate to insurance claims and are filtered to limit the results to certain courts in Alabama. The fourth and fifth queries are queries on a different subject, contract law, and are filtered to limit the results to the state of Kentucky.

Next, in step 502, query engine 113 may receive a user selection of a subset of the queries in history tree 400. For example, the user may click select query icon 405 for the queries they wish to select. In the example shown, the user has selected the first three queries for subsequent processing by method 500. The user may then click find most relevant documents icon 406. At this time, client terminal 120 may transmit information to query engine 113 indicating which queries the user has selected for further processing.

Next, in step 503, query engine 113 may determine the number of result sets for the selected queries that each candidate document appears in. For example, as discussed above, Case A appeared in all three of the user's selected queries, Cases B and C appeared in two each, and cases D and E each appeared in only one query.

Next, in step 504, query engine 113 may rank the candidate documents based on the number of result sets that each candidate document appeared in. For example, query engine 113 would rank the candidate documents in the order ABCDE, as discussed above with respect to method 300, and as shown in FIG. 2C. In some embodiments, query engine 113 may transmit an interface (not shown) including a list similar to ranked candidate document list 204 to client terminal 120.

Next, in step 505, query engine 113 may provide the user with requested candidate documents from the ranked list. For example, the user may click hyperlinks identifying one or more of the ranked candidate documents, and query engine 113 may respond by transmitting the corresponding candidate document to client terminal 120. Users may click clear history tree icon 406 when they are finished, and query engine 113 will reset the user's query history.

Using method 500 as discussed above, the user can manually decide which queries they wish to use to develop a ranked list of candidate documents. In contrast, method 300 automatically ranks the candidate documents each time the user enters a new query. Method 500 may provide additional flexibility for the user. For example, in some embodiments, history tree 400 may include a selectable option (not shown) to rank the candidate documents from either the filtered or unfiltered results for each particular query. In such embodiments, the user may, for example, choose to develop a ranked list of candidate documents from the filtered result sets for their first and second queries and the unfiltered result set for their third query. In still further embodiments, history tree 400 may include selectable options (not shown) for allowing the user to specify a subset of filters for each query that are used to develop the ranked list of candidate documents.

In the embodiments discussed above, the candidate documents provided to the user were ranked based on the number of queries that they matched, i.e., the number of result sets that they appeared in. However, in some embodiments, the ranking of the candidate documents may be performed based on additional factors besides the number of queries each candidate document matches.

For example, each time query engine 113 executes a query, query engine 113 may rank each candidate document based on its relevance to that particular query. Thus, query engine 113 may account for each candidate document's ranking within each individual query as well as the total number of queries that the candidate document matches. For example, a scoring scheme may be used where the top 100 candidate documents for each query receive a score, e.g., the top candidate document receives 100 points, the second-closest query match receives 99 points, etc. In step 306 of method 300 and step 504 of method 500, query engine 113 may rank the candidate documents by adding up the individual scores for each individual query, instead of simply counting the number of queries that each candidate document matched.

In still further embodiments, weighting schemes may be employed to further refine the rankings. For example, users could be allowed to weight each individual query as they choose, for example by assigning weights from one to five to each query. The weight of each query could then be multiplied by the number of matched queries or individual query scores for each candidate document. In such embodiments, the user has the flexibility to prioritize their queries and receive a customized list of ranked candidate documents based on the weights they assign to each query.

Additionally, each candidate document in document database 114 may be weighted by applying certain document classifications in the weighting scheme. As an example, the documents in document database 114 may have some corresponding metadata that indicates the document is in a particular classification. For example, the user may specify a particular class of cases that are of interest, such as cases classified as relating to insurance fraud. Cases A, B, and C may all be cases that are classified in document database 114 as relating to insurance fraud, whereas cases D and E may be classified differently, e.g., as contracts cases. In such embodiments, query engine 113 may weight the documents classified as insurance fraud cases more highly than those cases that are not classified as insurance fraud cases. In still further embodiments, query engine 113 may use automated techniques such as clustering algorithms to automatically determine, based on the user's queries, that they are interested in a particular taxonomy of cases, and weight the rankings accordingly.

Furthermore, query engine 113 may weight the documents in document database 114 by other relevant characteristics. As an example, court opinions from the highest court in a given jurisdiction may generally be considered more important than opinions from lower-ranking courts in the jurisdiction. Thus, the ranking scheme may also weight documents from higher-ranked courts more heavily than documents from lower-ranked courts. Similarly, precedential court opinions may be weighted more heavily than slip opinions, en banc opinions may be weighted more heavily than opinions by smaller panels from the same court, and federal cases may be weighted more heavily than state cases. In some embodiments, users may also specify that opinions from certain states, geographical regions, or U.S. Circuit Court jurisdictions should be weighted more heavily than other cases.

In further embodiments, query engine 113 may provide the user with certain suggestions for search terms to use in queries. As an example, query engine 113 may use clustering algorithms to determine which search terms tend to be entered by users when searching a particular topic. For example, the search term "two years" may frequently be used in queries by users who search for "fraud claim," insurance fraud," and "incontestable clause," because an incontestable clause typically takes effect after an insurance policy has been in effect for two years. Query engine 113 may track the usage of these search terms by users over time, and determine that the term "two years" is frequently used with these other three search terms. After the user uses the terms "fraud claim," "insurance fraud," and "incontestable clause" to execute the first three queries, query engine 113 may suggest the search term "two years" to the user by transmitting the term in a web page to client terminal 120. In further embodiments, query engine 113 may propose a full query including several search terms to the user, for example by providing the user with a query that was previously entered by another user.

In some embodiments, users may also choose to find cases that are related to one of the cases they have already found. For example, as shown in FIG. 2C, the user may select a case, e.g., Case A, from ranked document list 204 and drag the case into My Workspace 206. The user may then click Find Related Cases icon 207, and query engine 113 will search document database 114 for cases that are related to Case A.

For example, query engine 113 may search document database 114 for cases that include words or phrases that also appear in Case A. As another example, query engine 113 may search document database 114 for cases that cite to Case A, or that Case A cites to. Query engine 113 may also search document database 114 for cases that do not directly cite Case A or vice versa, but that include one or more common citations with Case A. Thus, query engine 113 may help the user find cases that may not have found by entering queries, but that still may be relevant to the topic of interest to the user.

In further embodiments, query engine 113 may support additional types of searches such as Boolean or natural language searches. For example, in a Boolean search, the user may enter a query using Boolean terms such as "AND" or "OR" to connect search terms. As an example, the user may enter the Boolean query "Incontestable clause AND fraud claim." In such embodiments, at step 304 of method 300, query engine 113 may search document database 114 for documents that match both the search term "Incontestable clause" and the search term "fraud claim." As another example of a Boolean search, the user may enter the query "Incontestable clause OR fraud claim." In such embodiments, query engine 113 may search document database 114 for documents that match either the search term "Incontestable clause," the search term "fraud claim," or both.

As an example of a natural language search, the user may phrase their query as a question. For example, the user may enter the query "What is the effect of an incontestable clause in an insurance policy?" At step 304 of method 300, query engine 113 may parse the natural language query into several search terms, such as "incontestable clause" and "insurance policy." Query engine 113 may then search document database 114 for documents that match the search terms "incontestable clause" and "insurance policy." As another example, the user may enter the query "What is the effect of an incontestable clause on a fraud claim?" Likewise, query engine 113 may search document database 114 for documents that match the search terms "incontestable clause" and "fraud claim."

In still further embodiments, query engine 113 may perform query expansion on search terms included in user queries. Query expansion may be performed using natural language techniques such as "stemming," where search terms are reduced to their word stem before being compared with the documents in document database 114. As an example, for the search term "Incontestable clause," query engine 113 may search for the word stem "contest" from the word "Incontestable." As another example, for the search term "Insurance policy," query engine 113 may search for the word stem "insure" from the word "insurance." In still further embodiments, query engine 113 may use regular expressions to implement the stemming techniques, such as by using a wildcard operator such as to match one or more characters other than the word stem, such as prefixes and suffixes. In such embodiments, query engine 113 may search document database 114 using the regular expression ".*insur.*" as the stem for the search term "insurance," or the regular expression ".*contest.*" for the search term "incontestable."

In still further embodiments, query engine 113 may perform query expansion by transforming the user's search terms into synonyms, abbreviations, or other equivalent terms. For example, query engine 113 may use the synonyms "indisputable" or "irrefutable" as substitutes for the user-supplied search term "incontestable," and may use the abbreviation "ins." as a substitute for the user-supplied search term "insurance." Using such techniques, query engine 113 may find documents in document database 114 that do not directly match the user-supplied search terms, but are still likely to be relevant to the user because these documents include the substitutions made by query engine 113.

In still further embodiments, query engine 113 may automatically initiate additional searches derived from the user-entered queries. For example, query engine 113 may use information sources such as web analytics to determine one or more additional queries or search terms to apply at step 304 of method 300. Query engine 113 may do so by determining additional queries that users have submitted on similar topics. For example, incontestable clauses in insurance documents may typically take effect after the insurance policy has been in effect for two years. Other users may have frequently used the search term "two years" in conjunction with the search term "Incontestable Clause."

For example, previous users may have applied Boolean searches such as "Incontestable Clause AND Two Years" or natural language searches such as "What is the effect of an incontestable clause after two years?" In such embodiments, query engine 113 may determine that the search term "two years" is often relevant to queries that include the term "Incontestable Clause," and may independently search document database 114 for the search term "two years" even though the search term may not have originally been supplied by the current user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or data processing systems, including personal computers, servers, laptops, mainframes, micro-processors and the like. Additionally, although aspects are described as being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as spreadsheet or browser software.

Moreover, while illustrative embodiments have been described herein, the scope includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the disclosed embodiments.

It is intended, therefore, that the specification and examples be considered as exemplary only, with a true scope and spirit being indicated by the following claims and their full scope of equivalents.

What is claimed is:

1. A computer-implemented method for ranking documents, comprising:
   receiving a first query from a user, the first query being related to a search topic;
   comparing the first query to a plurality of documents stored in a database to identify a first set of candidate documents, each of the first set of candidate documents matching the first query;
   providing an interface to the user, the interface including references to the first set of candidate documents as well as a query icon representing the first query;
   receiving a second query from the user, the second query being related to the search topic;
   comparing the second query to a plurality of documents stored in a database to identify a second set of candidate documents, each of the second set of candidate documents matching the second query;
   comparing the first and second set of candidate documents from the first query and the second query to identify an updated set of candidate documents, each of the updated set of candidate documents matching one or more of the first and second queries;
   determining, for the updated set of candidate documents, a count of matching queries;
   ranking, using a computer processor, the updated set of candidate documents for relevance to the search topic based at least on the count of matching queries for each respective candidate document;
   providing an updated interface to the user, the updated interface including references to one or more of the ranked candidate documents and the count of matching queries for each respective one or more of the ranked candidate documents as well as a second query icon representing the second query;
   updating a graphical user interface element comprising a progress bar which indicates whether a user has performed sufficient queries to complete the search;
   providing a reset icon for the user to reset a search session; and
   resetting the count of matching queries for the candidate documents to zero when the user selects the reset icon.

2. The computer-implemented method according to claim 1, further comprising:
   receiving a request for one of the candidate documents; and
   transmitting the requested candidate document in response to the request.

3. The computer-implemented method according to claim 1, wherein the documents relate to court cases.

4. The computer-implemented method according to claim 1, further comprising updating the ranking of the candidate documents as new queries are received from the user.

5. The computer-implemented method according to claim 1, further comprising:
   determining a relevance score for each candidate document and query, the relevance score indicating the degree to which each candidate document matches each query, wherein the documents are ranked based at least on the relevance scores.

6. The computer-implemented method according to claim 1, further comprising:
   receiving user inputs specifying weights for each of the queries, wherein the documents are ranked based at least on the weights; and
   providing an interface to allow said user to deselect a query icon to determine a different set of candidate documents based on a subset of the queries received by the user.

7. A system for ranking documents, comprising:
   a processor for executing program instructions; and
   a non-transitory computer-readable medium storing the program instructions, the program instructions, when executed by the processor, performing a method to:
   receive a first query from a user, the first query being related to a search topic;
   compare the first query to a plurality of documents stored in a database to identify a first set of candidate documents, each of the first set of candidate documents matching the first query;
   provide an interface to the user, the interface including references to the first set of candidate documents as well as a first query icon representing the first query;
   receive a second query form the user, the second query being related to the search topic;
   compare the second query to a plurality of documents stored in a database to identify a second set of candidate documents, each of the second set of candidate documents matching the second query;
   compare the first and second set of candidate documents from the first query and the second query to identify an updated set of candidate documents, each of the updated set of candidate documents matching one or more of the first and second queries;
   determine, for the updated set of candidate documents, a count of matching queries;
   rank the updated set of candidate documents for relevance the search topic based at least on the count of matching queries for each respective candidate document; and
   provide an updated interface to the user, the updated interface including references to one or more of the ranked candidate documents and the count of matching queries for each respective one or more of the ranked candidate documents as well as a second query icon representing the second query;
   update a graphical user interface element comprising a progress bar which indicates whether a user has performed sufficient queries to complete the search;
   provide a reset icon for the user to reset a search session; and
   reset the count of matching queries for the candidate documents to zero when the user selects the reset icon.

8. A non-transitory computer-readable medium storing program instructions for performing a method executed by a processor, the method for ranking documents and comprising steps performed by the processor of:

receive a first query from a user, the a first query being related to a search topic;

compare the first query to a plurality of documents stored in a database to identify a first set of candidate documents each of the first set of candidate documents matching the first query;

provide an interface to the user, the interface including references to the set of candidate documents as well as a first query icon representing the first query;

receive a second query from the user, the second query being related to the search topic compare the second query to a plurality of documents stored in a database to indentify a second set of candidate documents, each of the second set of candidate documents matching the second query;

compare the first and second set of candidate documents from the first query and second query to the plurality of documents to identify an updated set of candidate documents, each of the updated set of candidate documents matching one or more of the first an second queries;

determine, for the updated set of candidate documents, a count of matching queries;

rank the updated set of candidate documents for relevance to the search topic based at least on the count of matching queries for each respective candidate document; and provide an updated interface to the user, the updated interface including references to one or more of the ranked candidate documents and the count of matching queries for each respective one or more of the ranked candidate documents as well as a second query icon representing the second query;

update a graphical user interface element comprising a progress bar which indicates whether a user has performed sufficient queries to complete the search;

provide a reset icon for the user to reset a search session; and rest the count of matching queries for the candidate documents to zero when the user selects the reset icon.

9. The system according to claim 7, wherein the program instructions further perform the method to:

receive a request for one of the ranked candidate documents; and transmit the requested candidate document in response to the request.

10. The system according to claim 7, wherein the documents relate to court cases.

11. The system according to claim 7, wherein the program instructions further perform the method to update the ranking of the candidate documents as new queries are received from the user.

12. The system according to claim 7, wherein the program instructions further perform the method to determine a relevance score for each candidate document and query, the relevance score indicating the degree to which each candidate document matches each query, wherein the documents are ranked based at least on the relevance scores.

13. The system according to claim 7, wherein the program instructions further perform the method to:

receive user inputs specifying weights for each of the queries, wherein the documents are ranked based at least on the weights; and provide an interface to allow said user deselect a query icon to determine a different set of candidate documents based on a subset of the queries received by the user.

14. The non-transitory computer-readable medium according to claim 8, wherein the program instructions further perform the method to:

receive a request for one of the ranked candidate documents; and transmit the requested candidate document in response to the request.

15. The non-transitory computer-readable medium according to claim 8, wherein the documents relate to court cases.

16. The non-transitory computer-readable medium according to claim 8, wherein the program instructions further perform the method to update the ranking of the candidate documents as new queries are received from the user.

17. The non-transitory computer-readable medium according to claim 8, wherein the program instructions further perform the method to determine a relevance score for each candidate document and query, the relevance score indicating the degree to which each candidate document matches each query, wherein the documents are ranked based at least on the relevance scores.

18. The non-transitory computer-readable medium according to claim 8, wherein the program instructions further perform the method to:

receive user inputs specifying weights for each of the queries, wherein the documents are ranked based at least on the weights; and provide an interface to allow said user to deselect a query icon to determine a different set of candidate documents based on a subset of the queries received by the user.

\* \* \* \* \*